United States Patent [19]
Ben-Nun et al.

[11] Patent Number: 5,568,470
[45] Date of Patent: Oct. 22, 1996

[54] METHOD FOR CONTROLLED-LATENCY TRANSFER OF TRANSMITT ATM TRAFFIC AND SYNCHRONOUS FEEDBACK OVER A PHYSICAL INTERFACE

[75] Inventors: Michael Ben-Nun, Jerusalem, Israel; Winthrop J. Wu, Marlborough; Niamh Darcy, Acton, both of Mass.

[73] Assignee: Digital Equipment Corporation, Maynard, Mass.

[21] Appl. No.: 430,945

[22] Filed: Apr. 28, 1995

[51] Int. Cl.$^6$ ..................................................... H04L 12/54
[52] U.S. Cl. .................. 370/17; 370/60; 370/94.1
[58] Field of Search ............................. 370/17, 60, 60.1, 370/61, 79, 94.1, 94.2, 108

[56] References Cited

U.S. PATENT DOCUMENTS

| | | | |
|---|---|---|---|
| 5,179,549 | 1/1993 | Joos et al. | 370/17 |
| 5,400,329 | 3/1995 | Tokura et al. | 370/17 X |
| 5,483,526 | 1/1996 | Ben-Nun et al. | 370/60.1 |
| 5,493,566 | 2/1996 | Ljungberg et al. | 370/60.1 X |

*Primary Examiner*—Melvin Marcelo
*Attorney, Agent, or Firm*—Kenneth F. Kozik

[57] ABSTRACT

In an asynchronous transfer mode (ATM) endnode a method is provided by which ATM cells can experience a small delay from the ATM layer to the PHY layer to transmission on the ATM network. Such an arrangement includes providing the endnode with an ATM layer, the ATM layer having a first-in-first-out (FIFO) queue for transmitting transmit ATM traffic, providing the endnode with a PHY layer, the PHY layer having a FIFO queue for receiving the transmit ATM traffic, providing an interface between the FIFO queue of the ATM layer and the FIFO queue of the PHY layer for the flow of the transmit ATM traffic, providing a signal in the ATM endnode, providing a state machine in the ATM endnode, the state machine monitoring the signal in the ATM endnode, stalling the transfer of the transmit ATM traffic from the FIFO of the ATM layer to the FIFO of the PHY layer over the interface when the signal and the state machine indicate that the FIFO of the PHY layer is full, and transmitting the transmit ATM traffic from the FIFO of the ATM layer to the FIFO of the PHY over the interface. By causing the ATM layer to generate/transfer a continuous stream of cells to the PHY layer, the method can provide cell time indications to allow the ATM layer to synchronize itself to the network.

14 Claims, 9 Drawing Sheets

EXEMPLARY ATM END NODE

EXEMPLARY ATM NETWORK

EXEMPLARY ATM END NODE

METHOD FOR CONTROLLED-LATENCY TRANSFER OF TRANSMITT ATM TRAFFIC AND SYNCHRONOUS FEEDBACK OVER A PHYSICAL INTERFACE

FIELD OF THE INVENTION

The present invention relates to data flow latency in a communications network, and more particularly to a method and apparatus for the controlled-latency transfer of asynchronous transfer mode (ATM) transmit traffic and synchronization feedback over a physical interface.

BACKGROUND OF THE INVENTION

The flow of data, known in the art as traffic, in an asynchronous transfer mode (ATM) network consists of ATM cells which are fixed-sized packets of 53 bytes that are transferred between ATM endnodes in the ATM network. In an ATM endnode, ATM cells are generated from user data by an ATM layer and transmitted over the ATM network by the PHY layer (as defined by the ISO standard). Typically, a simple interface is used to transfer ATM cells generated by the ATM layer to a first-in first-out (FIFO) queue in the PHY layer. One exemplary interface is an industry standard interface referred to as UTOPIA, i.e., the Universal Test and Operations PHY Interface for ATM. The UTOPIA specification, incorporated herein, defines the interface between the ATM layer and the PHY layer that is used to transfer ATM cells from the ATM layer to the PHY layer.

The UTOPIA specification (Level 1, Version 2.01 - Mar. 21, 1994) describes the interface as an "8-bit wide datapath, operating up to 25 MHz using either an octet-level or cell-level flow control." Two signals called TxFull*/TxClav and TxEnb* are used to implement the flow control in the transmit portion of the UTOPIA specification. TxEnb* is an active low signal asserted by the ATM layer during cycles when valid ATM cell data is being transferred. TxFull*/TxClav has different meanings depending upon the type of flow control being used.

For octet-level flow control, TxFull* is an active low signal from the PHY layer to the ATM layer, asserted by the PHY layer to indicate that the FIFO of the PHY layer can accept at most four more bytes of data. For cell-level flow control, TxClav is an active high signal from the PHY layer to the ATM layer, that is asserted by the PHY layer to indicate it can accept the transfer of a complete ATM cell. The PHY layer will deassert TxClav at least four bytes before the end of an ATM cell if it cannot accept the immediate transfer of the subsequent ATM cell.

If the ATM layer has user data to transmit, it will begin to generate ATM cells and transfer these ATM cells to the PHY layer while space is available in the FIFO of the PHY layer. Most PHY layer implementations will not remove an ATM cell from their FIFO for transmission onto the ATM network until the entire ATM cell is present in the FIFO. In order to ensure that the entire bandwidth of the ATM network can be utilized, most ATM layers are able to generate and transfer ATM cells to the PHY layer faster than the PHY layer can transmit these ATM cells onto the network. With constant data traffic, the FIFO of the PHY layer will eventually fill up with N ATM cells, where N is the size of the FIFO in ATM cells. ATM cells that are transferred from the ATM layer to the PHY layer when the FIFO of the PHY layer is full or nearly full will sit in the FIFO of the PHY layer for (N−1) ATM cell times before they can be transmitted onto the ATM network. The flow control mechanism of the UTOPIA specification will only prevent overflowing the FIFO of the PHY layer. The UTOPIA specification does not provide a mechanism to allow the ATM layer to keep the FIFO of the PHY layer as empty as possible or to permit the ATM layer to synchronize itself to the ATM network.

A mechanism to control the latency experienced by an ATM cell before transmission out onto the ATM network is needed, as well as a means to allow the ATM layer to suspend the transfer of ATM cells to the PHY layer when the FIFO of the PHY layer is nearly full or full with N ATM cells in order to permit the removal of a programmable number of bytes from the FIFO. In addition, a means to synchronize the ATM layer to the ATM network is needed.

SUMMARY OF THE INVENTION

In accordance with the present invention, a method for a controlled-latency transfer of transmit asynchronous transfer mode (ATM) traffic in an ATM endnode includes the steps of providing the endnode with an ATM layer, the ATM layer having a first-in-first-out (FIFO) queue for transmitting transmit ATM traffic, providing the endnode with a PHY layer, the PHY layer having a FIFO queue for receiving the transmit ATM traffic, providing an interface between the FIFO queue of the ATM layer and the FIFO queue of the PHY layer for the flow of the transmit ATM traffic, providing a signal in the ATM endnode, providing a state machine in the ATM endnode, the state machine monitoring the signal in the ATM endnode, stalling the transfer of the transmit ATM traffic from the FIFO of the ATM layer to the FIFO of the PHY layer over the interface when the signal and the state machine indicate that the FIFO of the PHY layer is full, and transmitting the transmit ATM traffic from the FIFO of the ATM layer to the FIFO of the PHY over the interface. With such an arrangement, a method by which ATM cell can experience a small delay from the ATM layer to transmission on the network is provided.

Furthermore, with such an arrangement, a method to allow the ATM layer to suspend the transfer of cells to the PHY layer when the FIFO of the PHY layer is nearly full or full with N cells in order to permit the removal of a programmable number of bytes from the FIFO is provided.

In addition, with such an arrangement, a method is provided which causes the ATM layer to transfer a constant stream of ATM cells whenever there is sufficient room in the FIFO of the PHY layer at a rate of roughly one cell per cell time on the network. When the method detects that the FIFO of the PHY layer is full or nearly so, it will cause the ATM layer to suspend its transferring of cell in order to allow the FIFO of the PHY layer to drain. Once the FIFO of the PHY layer has been emptied sufficiently, the method will allow the ATM layer to resume transferring ATM cells to the PHY layer. This throttling of cell traffic allows the latency for the cells to be controlled. By causing the ATM layer to generate/transfer a continuous stream of cells to the PHY layer, the method can provide cell time indications to allow the ATM layer to synchronize itself to the network.

BRIEF DESCRIPTION OF THE DRAWINGS

The novel features believed characteristic of the invention are set forth in the appended claims. The invention itself, however, as well as features and advantages thereof, will be best understood by reference to the detailed description of specific embodiments which follows, when read in conjunction with the accompanying drawings, wherein:

DETAILED DESCRIPTION

Figure 1:
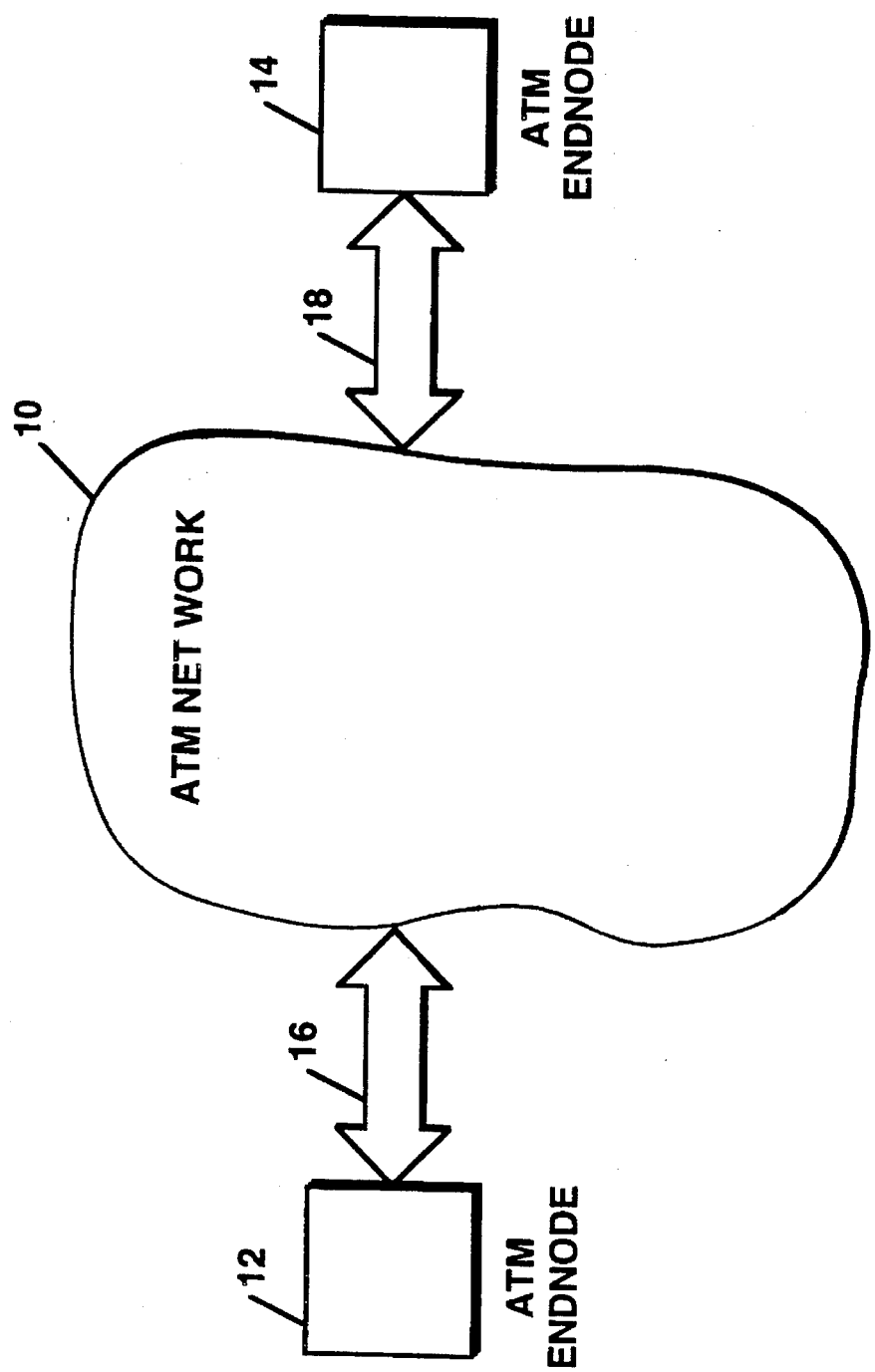
FIG. 1 is a block diagram showing an exemplary asynchronous transfer mode (ATM) local area network (LAN)

Referring to FIG. 1, an exemplary ATM network 10 is shown to include an ATM endnode 12 and an ATM endnote 14. Data transferred from ATM endnote 12 proceeds through a high speed line 16, onto the ATM network 10, and out through a high speed line 18 and into ATM endnode 14. An example of the high speed line 16 and the high speed line 18 is 155.52 Mbs SONET/SDH links.

Figure 2:
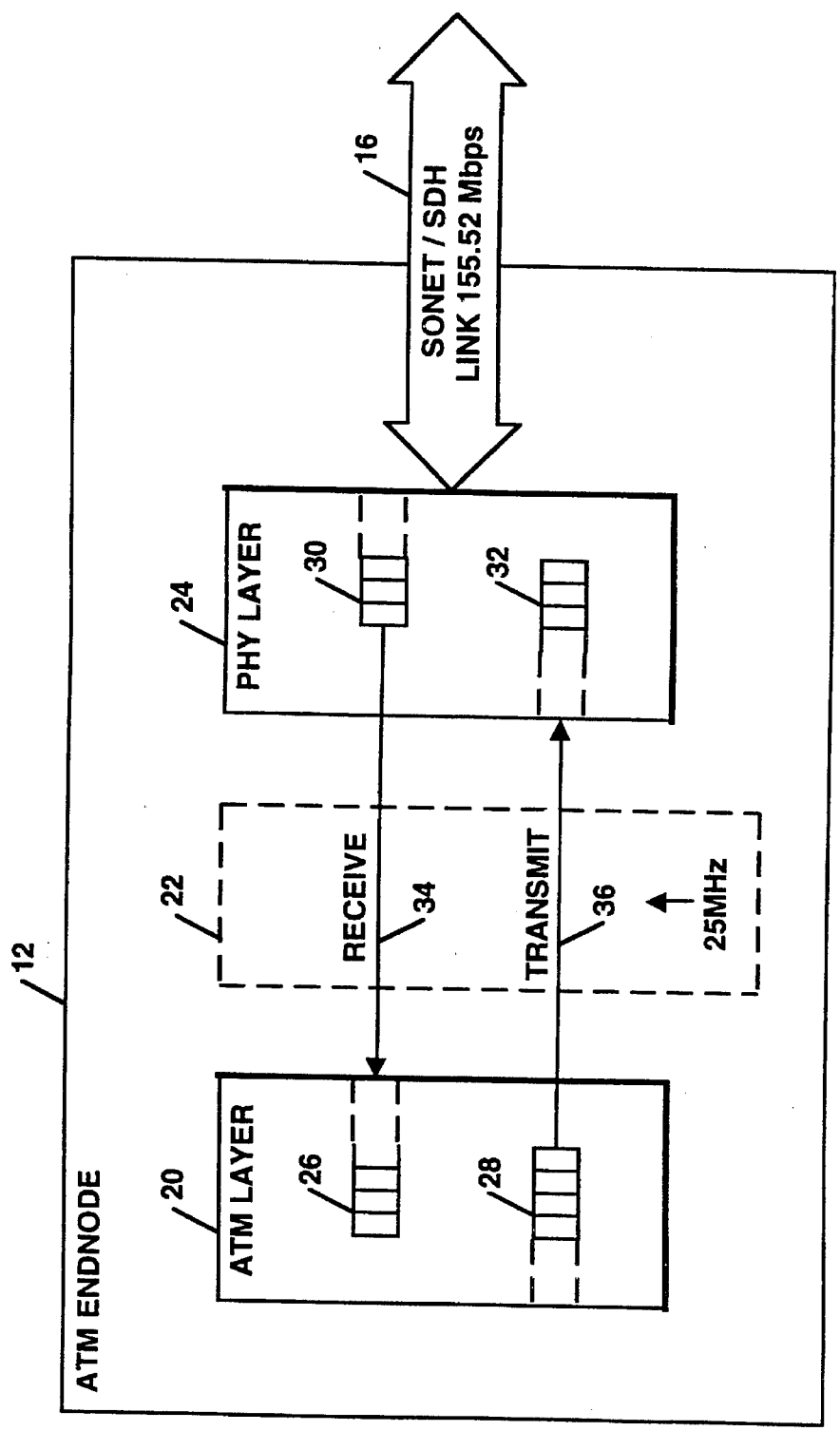
FIG. 2 is a block diagram showing an exemplary ATM Endnode of FIG. 1.

Referring to FIG. 2, the ATM endnode 12 is shown in greater detail. In the ATM endnode 12, ATM cells (not shown) are generated from user data (not shown) by an ATM layer 20 and sent via an interface 22 to a PHY layer 24. The ATM cells are then sent from the PHY layer 24 though the high speed line 16 and out onto the ATM network (10 of FIG. 1). As mentioned above, an exemplary interface 22 is defined by the UTOPIA specification.

The ATM layer 20 is further shown as having an ATM layer receive FIFO 26 and an ATM layer transmit FIFO 28. The PHY layer 24 is further shown as having a PHY layer receive FIFO 30 and a PHY layer transmit FIFO 32. Data received by the ATM layer receive FIFO 26 from the PHY layer receive FIFO 30 flows over a line 34 in the interface 22, while data transmitted from the ATM layer transmit FIFO 28 to the PHY layer transmit FIFO 32 flows over a line 36 in the interface 22. Typically, an interface 22 designed according to the UTOPIA specification permits the ATM layer 20 to transfer data up to a rate of 25 Mbytes per second.

Figure 3:
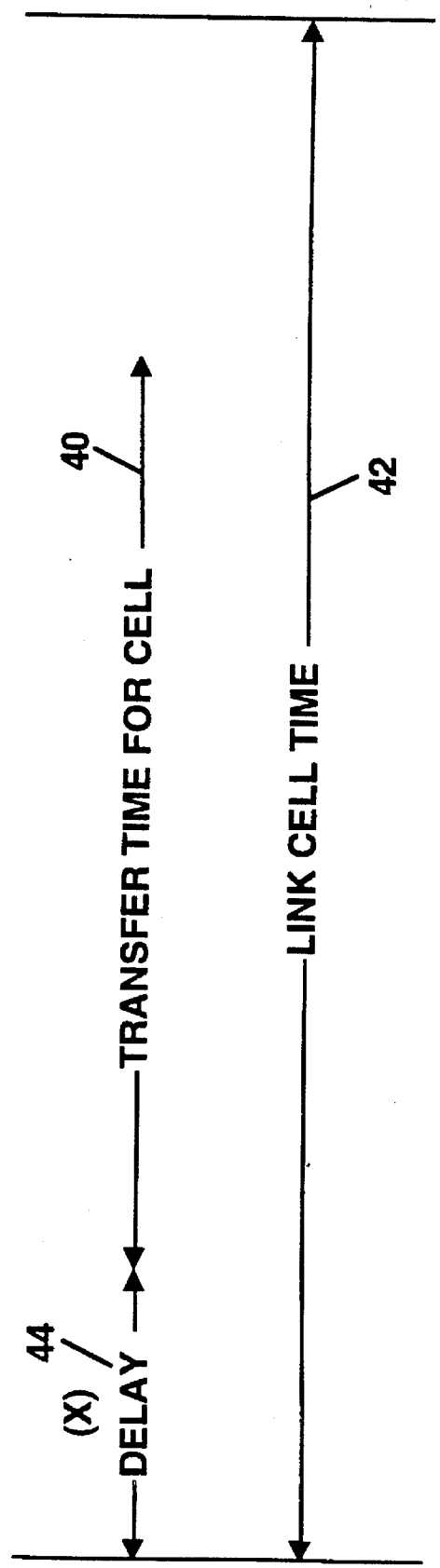
FIG. 3 is a graph in accordance with present invention illustrating the introduction of a delay time.

Referring to FIG. 3, at 25 Mbytes per second, an ATM cell will take 2.12 uS to transfer all 53 of its byes, i.e., a transfer time for an ATM cell 40. In an ATM network 10 using 155.52 Mbs SONET/SDH links for their high speed lines 16 and 18, the time to transfer an ATM cell, which is referred to as link cell time 42, varies from 2.7 uS to 3.14 uS. Since the transfer time 40, which represents the time to transfer an ATM cell from the ATM layer 20 to the PHY layer 24, is smaller than the link cell time 42 as seen on the ATM network 10, the current invention adds a delay X 44 before the start of every ATM cell transfer. As can be seen in FIG. 3, the combined duration of the delay 44 and the transfer time 40 is slightly smaller than the cell time 42.

As previously mentioned, the UTOPIA specification (Level 1, Version 2.01-Mar. 21, 1994) describes the interface 22 as an "8-bit wide datapath, operating up to 25 MHz using either an octet-level or cell-level flow control". Two signals called TxFull*/TxClav and TxEnb* are used to implement the flow control in the transmit portion of the UTOPIA specification. TxEnb* is an active low signal asserted by the ATM layer 20 during cycles when valid ATM cell data is being transferred. TxFull*/TxClav has different meanings depending upon the type of flow control being used.

For octet-level flow control. TxFull* is an active low signal from the PHY layer 24 to the ATM layer 20, asserted by the PHY layer 24 to indicate the FIFO of the PHY layer 32 can accept at most four more bytes of data. For cell-level flow control, TxClav is an active high signal from the PHY layer 24 to the ATM layer 20, that is asserted by the PHY layer 24 to indicate that it can accept the transfer of a complete ATM cell. The PHY layer 24 will deassert TxClav at least four bytes before the end of an ATM cell if it cannot accept the immediate transfer of the subsequent ATM cell.

In the present invention, TxSpaceAvail is an active high signal that indicates that the FIFO 32 of the PHY layer 24 is capable of accepting four or more bytes in octet-level flow control or at least one more ATM cell in cell-level flow control. N represents the size of the FIFO 32 of the PHY layer 24 in cells. X is a programmable value that delays the start of the transfer of every cell by the ATM layer 20. Y represents a delay, in byte-times, which is used to stall the ATM layer 20 when the FIFO 32 of the PHY layer 24 signals that it is nearly full.

Since the ATM layer 20 can transfer cells to the FIFO 32 of the PHY layer 24 slightly faster than the PHY layer 24 can remove cells from the FIFO 32, over time the FIFO 32 will gradually fill up. When the present invention detects this case, it will stall generation of cells by the ATM layer 20 for a period Y to allow the PHY layer 24 to drain Y bytes from its FIFO 32. Since the FIFO 32 of the PHY layer 24 is nearly full with N cells, any traffic sent out during this period would end up sitting in the FIFO 32 for (N−1) cell times before being transmitted out on the ATM network through the line 16, for example. If the ATM layer 20 had no user data to send out at this time, then the stall period Y will not have a noticeable effect on cell transmission on the ATM network 10. However, if the ATM layer 20 had user data to send out when the FIFO 32 of the PHY layer 24 is nearly full or full with N cells, then one of two things may be done. First, transfer of user data to the FIFO 32 of the PHY layer 24 may occur as soon as space is available. Second, the system may wait for a drain period Y to elapse before beginning of the transfer of the user data.

If the transfer of user data to the FIFO 32 of the PHY layer 24 occurs as soon as space is available, the user data will remain in the ATM layer 20 for one cell time and sit in the FIFO 32 of the PHY layer 24 for up to (N−2) cell times before it can be transmitted out onto the ATM network. If the transfer of user data occurs after waiting for a drain period Y to elapse, the user data will sit in the ATM layer 20 for drain period Y before it is transferred to the FIFO 32 of the PHY layer 24. In the PHY layer 24, it is desired that user data should experience the minimum latency through the PHY layer 24 to the ATM network. If the drain period Y is carefully chosen, the user data will experience the minimum latency through the PHY layer 24 when the system waits for the drain period Y to elapse before beginning transfer of the user data. By stalling the ATM layer 20 for a period Y to allow the FIFO 32 of the PHY layer 24 to drain, an indication is provided to the ATM layer 20 that the FIFO 32 of the PHY layer 24 is full, or almost full, and allows it to react accordingly, if necessary.

The present invention requires the ATM layer 20 to be modified to generate Idle/Unassigned cells and a timer capable of timing several cell-times with byte-transfer-time resolution. In addition, the present invention incorporates a state machine (SYNC SM), more fully described with reference to FIG. 4, to monitor the TxSpaceAvail signal and cell transfer.

Figure 4:
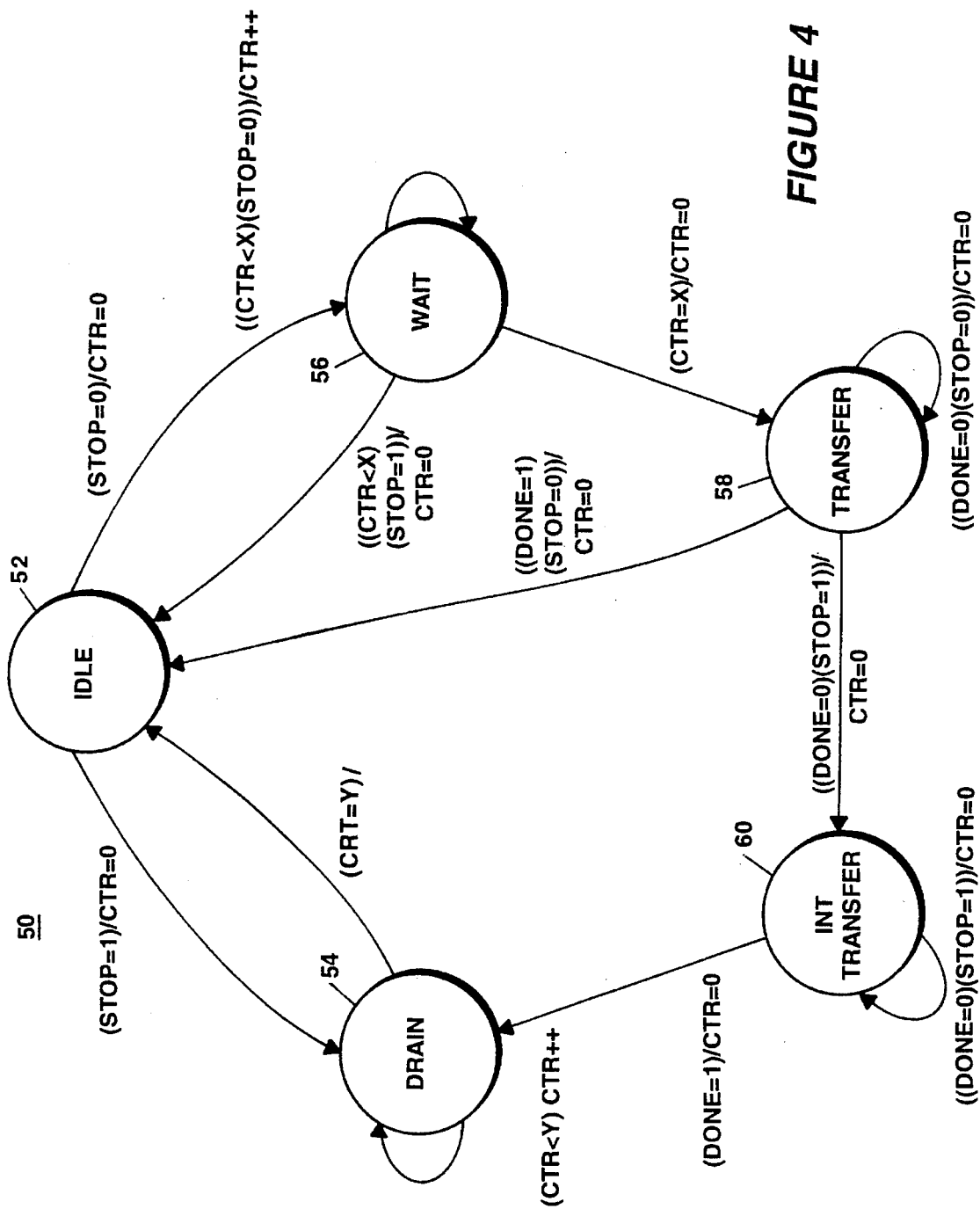
FIG. 4 is a block diagram of the state machine for monitoring the TxSpaceAvail signal and cells according to the present invention.

Referring to FIG. 4, a state machine 50 for monitoring the TxSpaceAvail signal is shown. In FIG. 4, X refers to the start of the transfer delay, Y refers to the drain period (also referred to as drain delay), DONE signifies that the entire ATM Cell has been transferred to the PHY layer 24, STOP indicates that no space is available in the FIFO 32 of the PHY layer 24 and is the inverse of TxSpaceAvail, and CTR refers to counter outputs. Referring now to FIG. 4, if the Sync state machine 50 is in an IDLE state 52 and TxSpaceAvail is deasserted (STOP-1), the Sync state machine 50 will move to a DRAIN state 54, since this indicates that the FIFO 32 of the PHY layer 24 is full or nearly full. If the Sync state machine 50 is in the IDLE state 52 and TxSpaceAvail is asserted (STOP-0), the Sync state machine 50 will go to a WAIT state 56 and monitor the time that TxSpaceAvail is asserted. If TxSpaceAvail deasserts before a pre-programmed limit X, the Sync state machine 50 will return to the IDLE state 52 and wait for TxSpaceAvail to reassert. If the duration of TxSpaceAvail's assertion exceeds the pre-programmed limit X, the Sync state machine 50 advances to a TRANSFER state 58 and notifies the ATM layer 20 to begin transmission of an ATM cell to the PHY layer 24. It will be appreciated that if the ATM layer 20 does not have any data traffic ready to transmit, then it must generate an idle/unassigned cell when notified by the Sync state machine 50 to begin transfer.

While the Sync state machine 50 is in the TRANSFER state 58, it monitors the TxSpaceAvail signal and awaits an indication from the ATM layer 20 that the last byte, of the cell currently being transferred, has been sent to the PHY layer 24. This indicates completion of the cell transfer by the ATM layer 20. Upon completion of the cell transfer by the ATM layer 20, the Sync state machine will return to the IDLE state 52 if TxSpaceAvail has been asserted throughout the duration of the cell transfer. If TxSpaceAvail deasserts while cell transfer is still in progress, the Sync state machine 50 will advance into an INT_TRANSFER state 60; this indicates that the FIFO 32 of the PHY layer 24 is nearly full, or full, with N ATM cells. After the cell transfer has completed, the Sync state machine 50 will go to the DRAIN state 54 and remain there for a pre-programmed time Y. This will allow the PHY layer 24 to drain out Y bytes from its FIFO 32 before the ATM layer 20 can send any more cells. After Y time has elapsed, the Sync state machine 50 returns to the IDLE state 52 to await the assertion of the TxSpaceAvail signal.

Figure 5:
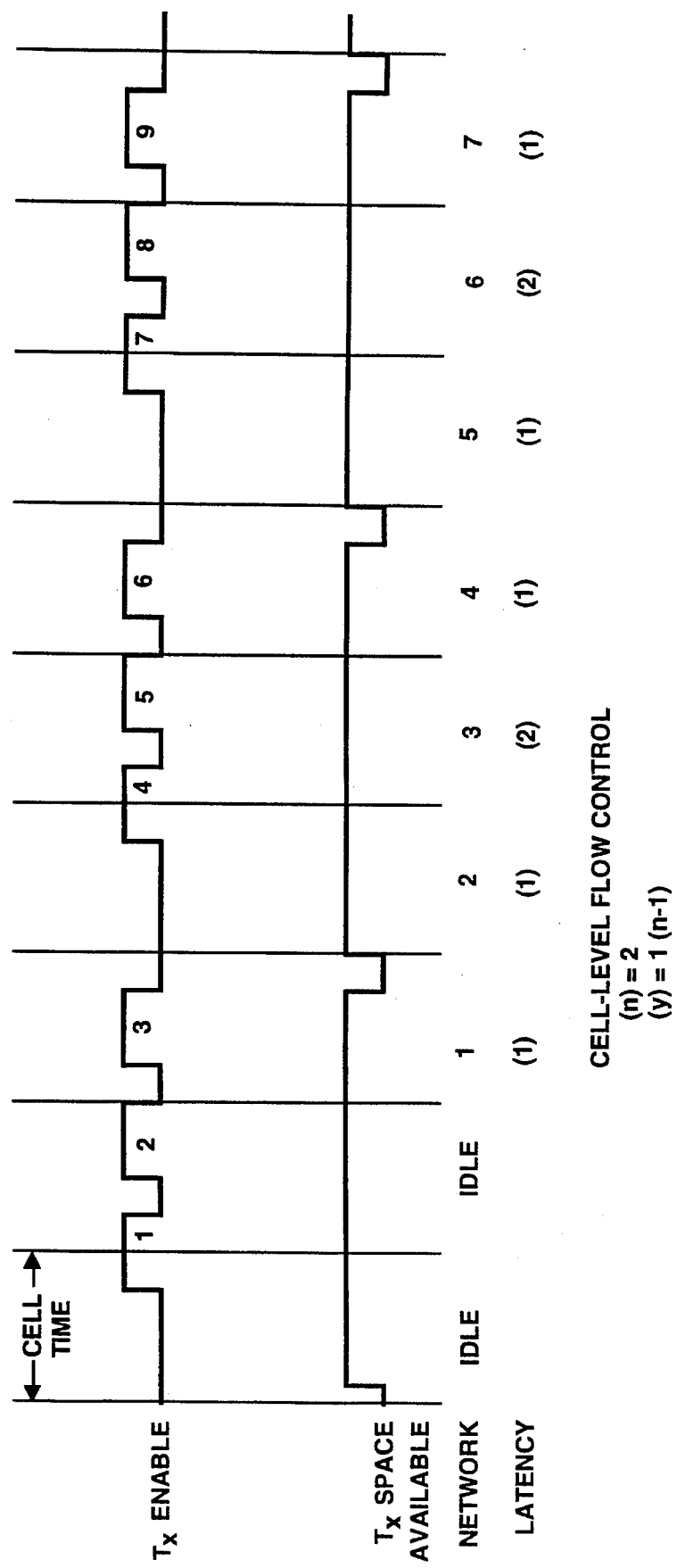
FIG. 5 is a timing diagram illustrating cell-level flow control in accordance with a first embodiment of the present invention.
Figure 6:
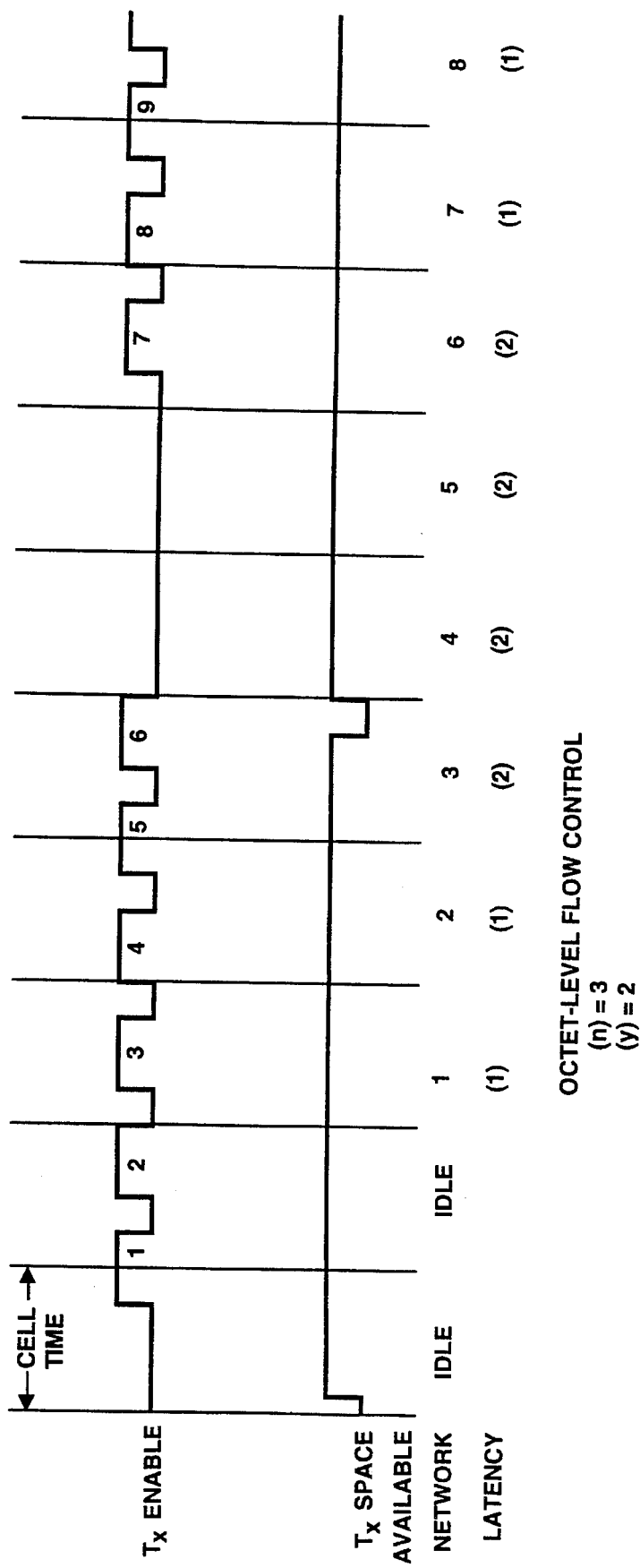
FIG. 6 is a timing diagram illustrating octet-level flow control in accordance with the first embodiment of the present invention.

In the preferred embodiment, Y, the programmable delay which allows the FIFO 32 of the PHY layer 24 to empty, is set to $((N-1)*53)$ byte times, so that the present invention will control the transfer of ATM cells such that they experience the minimum latency through the FIFO 32 of the PHY layer 24. FIG. 5 shows the timing when using cell-level flow control and $Y=((N-1)*53)$ byte times. FIG. 6 shows the timing when using octet-level flow control and $Y=(N-1)*53)$ byte times.

Figure 7:
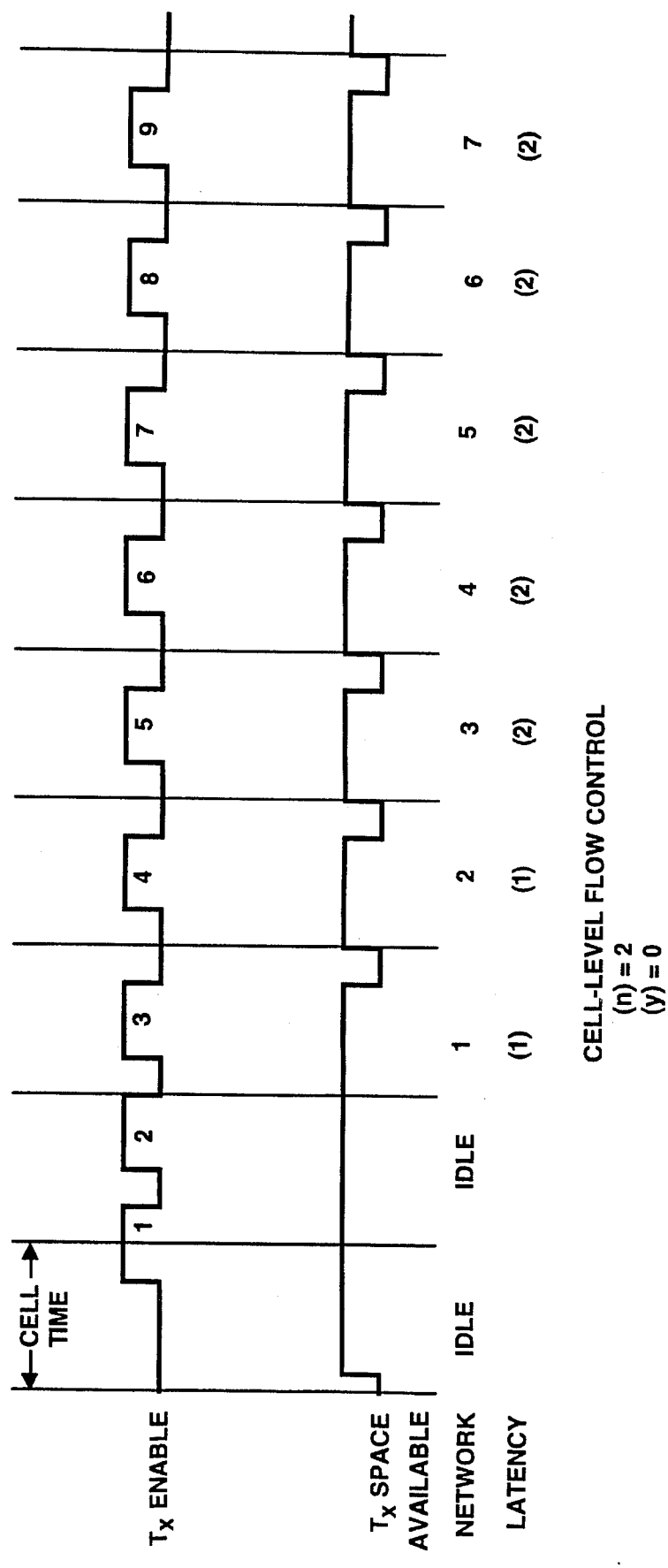
FIG. 7 is a timing diagram illustrating cell-level flow control in accordance with a second embodiment of the present invention.
Figure 8:
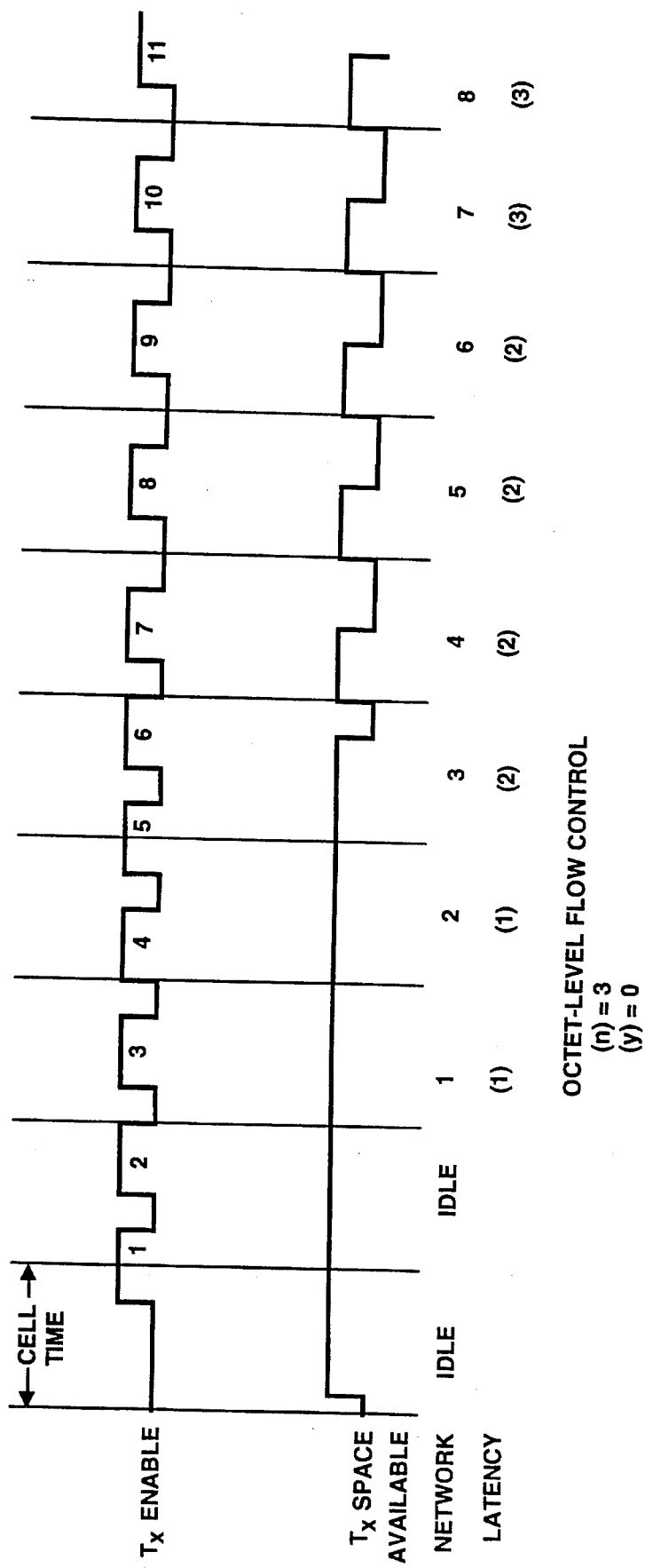
FIG. 8 is a timing diagram illustrating octet-level flow control in accordance with the second preferred embodiment of the present invention.

In an alternate preferred embodiment, Y, the programmable delay which allows the FIFO 32 of the PHY layer 24 to empty, is set to (0) byte times, so that the present invention can provide the ATM layer 20 with an indication of cell times from the ATM network 10 based upon the assertion of TxSpaceAvail. However, cells will not experience the minimum latency through the FIFO 32 of the PHY layer 24. FIG. 7 displays the timing for cell-level flow control using $Y=0$ byte-times, while FIG. 8 shows the timing for octet-level flow control using $Y=0$ byte-times.

Figure 9:
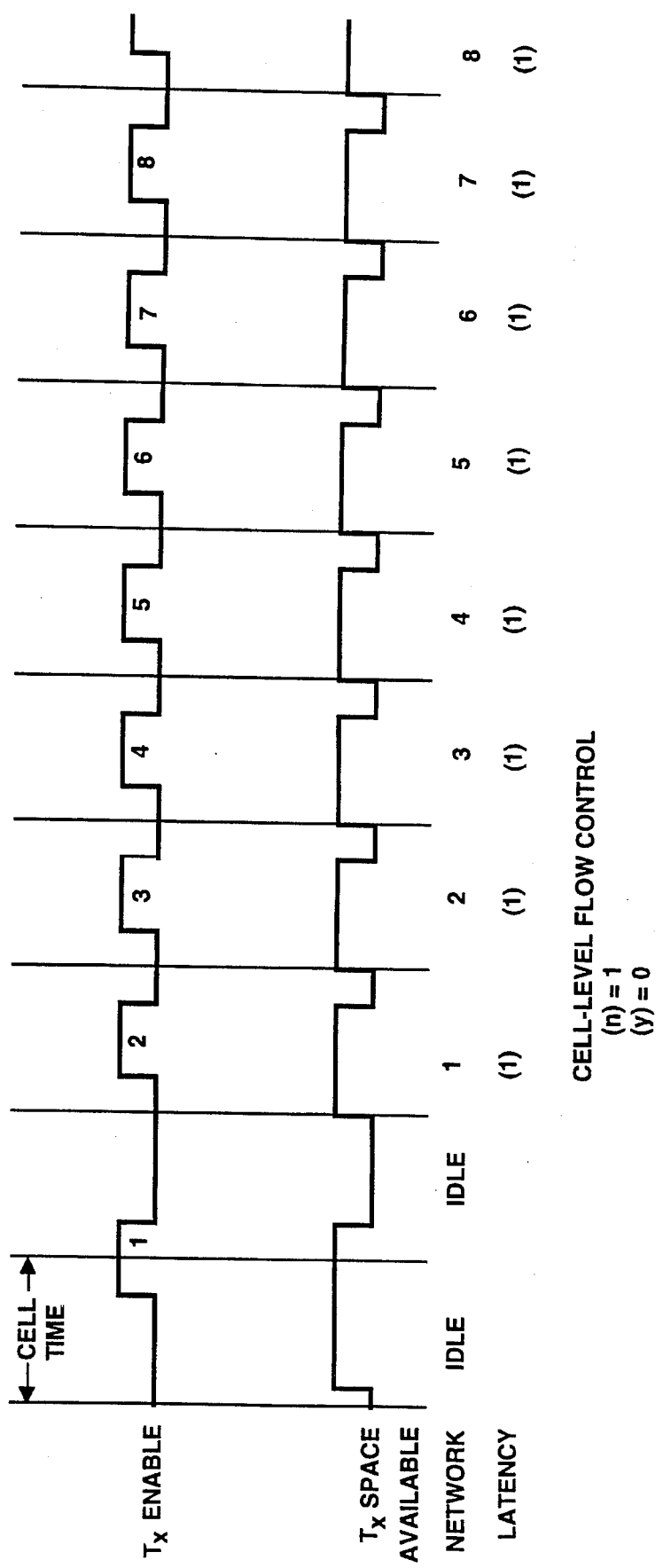
FIG. 9 is a timing diagram illustrating cell-level flow control in accordance with the present invention when the FIFO of the PHY layer is one cell deep.

If the FIFO 32 of the PHY layer 24 is of size one, then it is possible for the present invention to send the ATM cells through the PHY layer 24 with a minimum latency and to provide the ATM layer 20 with an indication of the cell times from the network. FIG. 9 illustrates the case where cell-level flow control is used and the FIFO 32 size is one.

As described above, the present is invention provides a means by which ATM cells can experience a small delay from the ATM layer 20 to transmission on the ATM network 10. This is important to certain kinds of traffic that will be carried over ATM cells. Generic Flow Control (GFC) information and Flowmaster™ credits are two examples of latency-sensitive traffic that can be carried over ATM cells. The present invention may also provide additional feedback to the ATM layer 20 which might indicate cell transfer times on the ATM network 10 and full conditions (or almost full conditions) in the FIFO 32 of the PHY layer 24. These indications may permit the ATM layer 20 to perform some of its functions more accurately, such as scheduling of transmit traffic, virtual circuit (VC) monitoring, and ATM network monitoring.

Having described a preferred embodiment of the invention, it will now become apparent to those skilled in the art that other embodiments incorporating its concepts may be provided. It is felt therefore, that this invention should not be limited to the disclosed invention, but should be limited only by the spirit and scope of the appended claims.

What is claimed is:

1. A method for a controlled-latency transfer of transmit asynchronous transfer mode (ATM) traffic in an ATM endnode comprising the steps of:

providing the endnode with an ATM layer, the ATM layer having a first-in-first-out (FIFO) queue for transmitting transmit ATM traffic;

providing the endnode with a PHY layer, the PHY layer having a FIFO queue for receiving the transmit ATM traffic from the ATM layer;

providing an interface between the FIFO queue of the ATM layer and the FIFO queue of the PHY layer for the flow of the transmit ATM traffic;

providing a signal in the ATM endnode;

providing a state machine in the ATM endnode, the state machine monitoring the signal in the ATM endnode;

stalling the transfer of the transmit ATM traffic from the FIFO of the ATM layer to the FIFO of the PHY layer over the interface when the signal and the state machine indicate that the FIFO of the PHY layer is full or nearly full; and transmitting the transmit ATM traffic from the FIFO of the ATM layer to the FIFO of the PHY layer over the interface.

2. The method for a controlled-latency transfer according to claim 1 wherein the transmit ATM traffic is a plurality of ATM cells.

3. The method for a controlled-latency transfer according to claim 2 wherein the ATM layer further includes:

means for generating idle/unassigned ATM cells; and a timer capable of timing several ATM cell-times with byte transfer-time resolution.

4. The method for a controlled-latency transfer according to claim 3 wherein the signal represents the space available in the FIFO of the PHY layer.

5. The method for a controlled-latency transfer according to claim 4 wherein the step of providing the state machine further includes the step of:

if the state machine is in an idle state and the signal is deasserted, the state machine placing itself in a drain state.

6. The method for a controlled-latency transfer according to claim 4 wherein the step of providing the state machine further includes the step of:

if the state machine is in an idle state and the signal is asserted, the state machine placing itself in the watt state and monitors the signal.

7. The method for a controlled-latency transfer according to claim 4 wherein the step of providing the state machine further includes the step of:

if a signal is still asserted at the end of a predetermined period of time, the state machine advances to a transfer state and notifies the ATM layer to begin the transmitting step; and if the signal is deasserted before the end of the predetermined period of time, then the state machine advances to an idle state to wait for the signal to reassert.

8. The method for a controlled-latency transfer according to claim 4 wherein the step of providing the state machine further includes the step of:

if the state machine notifies the ATM layer to begin the transmitting step and the ATM layer does not have ATM cells to transmit, the ATM layer transmitting idle/unassigned ATM cells.

9. The method for a controlled-latency transfer according to claim 4 wherein the step of providing the state machine further includes the steps of:

while the state machine is in a transfer state, the state machine monitoring the signal and waiting for an indication from the ATM layer that the step of transmitting is complete; and upon completion of the transmitting step the state machine returning to an idle state.

10. The method for a controlled-latency transfer according to claim 4 wherein the step of transmitting further includes the step of:

if the signal deasserts while the transfer is still in progress, the state machine going into an int_transfer state to indicate that the FIFO of the PHY layer is nearly full or full with ATM cells.

11. The method for a controlled-latency transfer according to claim 10 wherein the step of transmitting further includes the steps of:

after the ATM cell transfer is complete, the state machine placing itself in a drain state and remaining there for a predetermined amount of time to allow the PHY layer to drain out ATM cells from its FIFO before the ATM layer can send more ATM cells.

12. The method for a controlled-latency transfer according to claim 11 wherein the state machine returns to the idle state after the predetermined amount of time has lapsed.

13. The method for a controlled-latency transfer according to claim 11 wherein the predetermined amount of time is (size of the Phy layer FIFO minus one) times 53 byte-times.

14. The method for a controlled-latency transfer according to claim 11 wherein the predetermined amount of time is zero byte-times.

* * * * *